United States Patent Office 3,251,770
Patented May 17, 1966

3,251,770
PROCESS FOR PREPARING BORON-CONTAINING METAL SALTS OF PHOSPHOSULFURIZED POLYMER
Paul W. Vogel, Cleveland, Ohio, assignor to The Lubrizol Corporation, Wickliffe, Ohio, a corporation of Ohio
No Drawing. Filed May 3, 1962, Ser. No. 192,051
11 Claims. (Cl. 252—32.7)

This invention relates to a process for preparing compositions containing boron and a large amount of metal. In a more particular sense it relates to a process for preparing oil-soluble compositions containing boron and metal which are useful as additives in fuel oils and lubricating compositions.

Oil-soluble metal detergent compositions containing a large amount of metal are desirable as additives in lubricating oils because of their ability to prevent formation of sludge or varnish deposits and their effectiveness to counteract the harmful effects of the acidic products of oil degradation. An undesirable characteristic of such compositions as additives is that under severe conditions they tend to accelerate oxidation of the oil and cause corrosion of the metal surface being lubricated. It is accordingly an object of this invention to provide a process for preparing oil-soluble metal detergent compositions containing a large amount of metal and characterized by a reduced tendency to cause oxidative degradation of hydrocarbon oils and metal corrosion.

It is also an object of this invention to provide a process for preparing oil-soluble compositions containing a large amount of metal and boron.

It is also an object of this invention to provide additives in lubricating oils and fuels.

It is also an object of this invention to provide hydrocarbon oil compositions.

It is further an object of this invention to provide mineral lubricating oil compositions.

These and other objects are attained in accordance with this invention by providing a process for preparing boron-containing, basic metal detergent compositions comprising carbonating a mixture of an acidic, phosphosulfurized olefin polymer, a phenol, and at least about 10 equivalents of an alkaline earth metal base per equivalent of said acidic, phosphosulfurized olefin polymer to produce a carbonated, basic metal complex and treating said carbonated, basic metal complex with a boron compound selected from the class consisting of boron oxide, boron acids, and boron acid esters.

The olefin polymers from which the acidic, phosphosulfurized derivatives are obtained include principally the homopolymers and interpolymers of mono-olefins having from 2 to 12 carbon atoms, e.g., ethylene, propene, 1-butene, isobutene, 1-hexene, 1-octene, 2-methyl-1-heptene, 3-cyclohexyl-1-butene, 1-decene, 2-methyl-5-propyl-1-hexene, etc. Those derived from lower mono-olefins, i.e., olefins having less than about 5 carbon atoms are especially preferred. Also useful are the interpolymers of the mono-olefins with other interpolymerizable olefinic substances such as aromatic olefins, cycloaliphatic olefins, and polyolefins. The interpolymers include, for example, those prepared by polymerizing isobutene with styrene, isobutene with butadiene, propene with isoprene, ethylene with piperylene, isobutene with chloroprene, isobutene with p-methyl styrene, 1-hexene with 1,3-hexadiene, isobutene with styrene and piperylene, etc.

The relative proportions of the mono-olefins and the other olefinic monomers in the interpolymers may vary within wide ranges provided that the polyolefin, if used, is not present in sufficiently high proportions as to cause substantial cross-linking and insolubility. Also, the interpolymers should be substantially aliphatic, i.e., at least about 80% of the monomeric units should be derived from aliphatic olefin monomers. Specific examples of the useful interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 60% of isobutene with 20% of 1-pentene and 20% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene.

The methods of preparing the polymers and interpolymers illustrated above are known. A particularly useful method comprises the treatment of an olefin (e.g., isobutene) at a temperature from about −60° C. to about 20° C. with a Friedel-Crafts catalyst, e.g., boron trifluoride. The use of a solvent to facilitate mixing and transfer of the heat of reaction is advantageous. Such solvents may be n-butane, isobutane, n-hexane, naphtha, carbon tetrachloride, or ethane.

Olefin polymers having molecular weights above about 300 are useful. Those having molecular weights between 750 and 5000 are preferred. Higher molecular weight polymers, such as those having 100,000 or even higher molecular weights, likewise are useful.

The olefin polymers may be phosphosulfurized by treatment with a phosphorus sulfide such as phosphorus pentasulfide, phosphorus sesquisulfide, phosphorus heptasulfide, or phosphorus thiochloride. Other useful phosphosulfurizing agents are exemplified by phosphorus thiobromide, phosphorus and sulfur monochloride, phosphorus and sulfur, and phorphorus and sulfur dichloride.

Various techniques for effecting the phosphosulfurization are known. A very commonly used method involves simply mixing the olefin polymer with the phosphosulfurizing agent at the desired temperature, usually above 80° C. and preferably between 100° C. and 300° C. The amount of the phosphosulfurizing agent to be used in the treatment depends upon the nature of the product desired. For most applications products having a phosphorus content from about 0.05% to 10%, more often from 0.1% to 5%, are desirable. Thus the relative proportion of the phosphosulfurizing agent to be used is such as to provide from about 0.05 to 10 parts (by weight), more often from 0.1 to 5 parts, of phosphorus per 100 parts of the olefin polymer in the reaction mixture. In most instances the amount of the phosphosulfurizing agent is within the range from about 0.5 part to 25 parts per 100 parts of the olefin polymer in a reaction mixture.

The phosphosulfurized olefin polymers are acidic compositions, susceptible to conversion to carbonated, basic metal complexes from which the boron-containing, basic metal detergent compositions of this invention are derived. In most instances, however, it is advantageous to hydrolyze the phosphosulfurized olefin polymer before it is converted to the carbonated, basic metal complex. The hydrolysis may be carried out by treatment of the phosphosulfurized olefin polymer with water or steam. It removes from the phosphosulfurized olefin polymer that portion of the phosphorus and sulfur which is loosely held and results in a product of light color and high stability. The temperature at which the hydrolysis is effected is preferably between 100° C. and 200° C., although it can be 80° C. or even lower.

The alkaline earth metal bases useful for preparing the carbonated basic metal complexes for the most part are derived from magnesium, calcium, barium, and strontium. They include principally the oxides, hydroxides, alcoholates, phenates, sulfides, hyrides, and bicarbonates of such metals. The elemental metals likewise may be used.

The barium bases, especially oxides and hydroxides, are preferred.

The phenol present in the mixture to be carbonated functions to promote the incorporation of a large amount of metal into the carbonated, basic metal complex. Its presence in the final carbonated basic metal complex is not critical and in many instances it may be removed after carbonation by, e.g., distillation. Phenols useful as the promoting agent include phenol, naphthol, alkylated phenol, alkylated naphthol, or polar-substituted phenol or naphthol in which the polar substituent may be chloro, bromo, nitro, keto, or ether radical. For reasons of economy and their particular effectiveness, phenol and alkylated phenols are preferred. Specific examples of phenols useful as the promoting agent are phenol, alpha-naphthol, beta-naphthol, cresol, heptylphenol, dodecylphenol, didodecylphenol, trimethylphenol, nitrophenol, chlorophenol, methoxyphenol, dichlorophenol, behenylphenol, polyisobutene (molecular weight of 1000)-substituted phenol, the condensation product of octylphenol with formaldehyde, bis(heptylphenol)sulfide, 4,4'-dihydroxydiphenyl oxide, alpha-heptyl-beta-naphthol, beta-cyclohexyl-alpha-naphthol, thiophenol, thionaphthol, etc.

The amount of the promoting agent to be used in the carbonation mixture is best defined in terms of its chemical equivalents per equivalent of the acidic, phosphosulfurized olefin polymer. It may be as little as 0.1 equivalent or as much as 10 equivalents or even more per equivalent of the acidic, phosphosulfurized olefin polymer. The preferred amount is usually within the range from about 0.25 to 5 equivalents per equivalent of the acidic, phosphosulfurized olefin polymer. It will be noted that the equivalent weight of the promoting agent is based upon the number of the phenolic hydroxy radicals in the molecule and the equivalent weight of the acidic, phosphosulfurized olefin polymer is based upon the acidity as determined by the ASTM procedure No. 664–58. To illustrate, the equivalent weight of heptylphenol is its molecular weight whereas the equivalent weight of 4,4-dihydroxydiphenyl oxide is one-half its molecular weight.

The carbonated, basic metal complex is most conveniently obtained by preparing a mixture of a solution of the acidic, phosphosulfurized olefin polymer in a solvent, as phenol, and the appropriate excess of an alkaline earth metal base and treating the mixture with carbon dioxide at a temperature above about 100° C., preferably above 150° C. An alternative method comprises adding the alkaline earth metal base in small increments to the process mixture and carbonating the mixture after each increment. The solvent may be a fluid hydrocarbon such as benzene, toluene, xylene, cyclohexane, naphtha, or mineral oil.

It will be noted that upon mixing with the alkaline earth metal base, the acidic, phosphosulfurized olefin polymer forms a metal salt so that the process mixture before carbonation contains a metal salt of the acidic, phosphosulfurized olefin polymer and a large excess of the metal base. Such a mixture is heterogeneous primarily because of the presence of the large excess of the insoluble metal base. As carbonation proceeds the metal base becomes solubilized in the organic phase and the carbonated product eventually becomes a homogeneous composition containing an unusually large amount of metal. The mechanism of the formation of the homogeneous product is not fully understood. It is believed, however, that carbonation converts the excess metal base to a carbonate or bicarbonate which forms with the metal salt a homogeneous complex. The complex is readily soluble in the hydrocarbon solvent. However, it is not necessary for all of the metal base present in the process mixture to be so converted by carbonation to produce a soluble homogeneous product. In many instances a homogeneous product is obtained when as little as 75% of the excess of the metal base is carbonated. For the sake of convenient reference in the specification and the claims of this invention, the term "carbonated, basic metal salt" designates the homogeneous carbonated product without specific reference to the degree of conversion of the excess metal base by carbonation.

As indicated previously the boron-containing, basic metal detergent compositions of this invention are obtained by treating the carbonated, basic metal complex with a boron compound selected from the class consisting of boron oxide, boron acids, and boron acid esters. The treatment is carried out simply by mixing the reactants at a temperature above about 100° C., preferably about 150° C. The product may be filtered but in most instances filtration is optional.

The boron compounds useful in the process are illustrated by boric acid, tetraboric acid (i.e., $H_2B_4O_7$), metaboric acid (i.e., $HBO_2$), boron oxide, boron oxide hydrate, boronic acids (i.e., alkyl-$B(OH)_2$ and aryl-$B(OH)_2$), and esters of such boron acids. Specific examples of boronic acids include methylboronic acid, phenylboronic acid, cyclohexylboronic acid, p-hepthylphenylboronic acid, dodecylboronic acid, and octadecylboronic acid. The boron acid esters include especially the mono-, di-, and tri-organic esters of boric acid or a boronic acid with alcohols or phenols such as, e.g., methanol, ethanol, isopropanol, cyclohexanol, cyclopentanol, 1-octanol, 2-octanol, dodecanol, behenyl alcohol, oleyl alcohol, stearyl alcohol, benzyl alcohol, 2-butylecyclohexanol, ethylene gycol, propylene glycol, trimethylene gycol, 1,3-butanediol, 2,4-hexanediol, 1,2-cyclohexanediol, 1,3-octanediol, glycerol, pentaerythritol, diethylene glycol, carbitol, Cellosolve, triethylene glycol, tripropylene glycol, phenol, naphthol, p-butylphenol, o,p-diheptylphenol, n-cyclohexylphenol, 2,2-bis(p-hydroxyphenol)propane, polyisobutene (molecular weight of 1500)-substituted phenol, or-chlorophenol, m-nitrophenol, 6-bromooctanol, and 7-ketodecanol. Lower alcohols, 1,2-glycols and 1,3-glycols, i.e., those having less than about 8 carbon atoms, are especially useful for preparing boron acid esters for the purposes of this invention.

Methods for preparing the esters of boron acids are known and disclosed in the art (such as "Chemical Reviews" pages 959–1064, volume 56). Thus, one method involves the reaction of boron trichloride with three moles of an alcohol or a phenol to yield a tri-organic borate. Another method involves the reaction of boric oxide with an alcohol or a phenol. Another method involves the direct esterification of tetraboric acid with an alcohol or a phenol. Still another method involves the direct esterification of boric acid with a glycol to form, e.g., a cyclic alkylene borate.

The relative proportions of the boron compound and the carbonated basic metal complex depend to a large extent upon the amount of boron to be incorporated into the product and the amount of metal in the carbonated, basic metal complex, the latter in turn depending upon the amount of the metal base used in preparing the complex. The amount of the boron compound may be as little as 0.1 equivalent or as much as three equivalents, and preferably between about 1 and 2 equivalents, per each equivalent of the excess metal base used in preparing the complex, i.e., in excess of the acidic, phosphosulfurized olefin polymer. The equivalent weight of the boron compound is determined by the number of the "acidic hydrogen equivalents" present in the molecule. For instance, the equivalent weight of boric acid is one-third of its molecular weight, that of a boronic acid ester or ester is one-half of its molecular weight, and that of boron oxide is one-sixth of its molecular weight.

The following examples illustrate the process for preparing boron-containing, basic metal detergent compositions of this invention. (All parts are by weight unless otherwise specified.)

*Example 1*

A mixture of 100 parts of polyisobutene having a molecular weight of 1000 and 9 parts of phosphorus pentasulfide is heated at 260° C. for 10 hours. The mixture is then treated with steam at 150° C. and the hydrolyzed product is dried by blowing it with nitrogen at 150° C. for 5 hours. The hydrolyzed, acidic, phosphosulfurized polyisobutene is found to have a phosphorus content of 2.4%, a sulfur content of 2.8%, and an acid number of 47. A carbonated, basic metal complex is prepared as follows: A mixture of 2200 parts of mineral oil and 1150 parts (15 equivalents) of barium oxide is blown with steam to convert the barium oxide to barium hydroxide. To this mixture there is added 1060 parts (0.9 equivalent) of the above acidic, phosphosulfurized polyisobutene at 145°–150° C. in 3 hours. The mixture is then heated at 150° C. for 0.5 hour and mixed with 360 parts (1.9 equivalents) of heptylphenol. The resultant mixture is blown with carbon dioxide at 150°–160° C. until the mixture is substantially neutral. To 402 parts of the carbonated product there is added 31 parts (1.5 equivalents per equivalent of the barium oxide used above) of boric acid at 130° C. in 30 minutes whereupon water and carbon dioxide are liberated from the reaction mixture. The mixture is then heated at 155° C. for 1 hour, blown with nitrogen at this temperature for 4 hours, mixed with a filter aid, and filtered. The filtrate (315 parts) is diluted with mineral oil to a solution containing 25% of barium sulfate ash. The solution is found to have a boron content of 0.7%, a phosphorus content of 0.4%, a sulfur content of 0.1%.

*Example 2*

To 1200 parts of polyisobutene having a molecular weight of 1000 there is added 108 parts of phosphorus pentasulfide at 65° C. The mixture is heated at 115° C. for 9.5 hours and then to 260° C. for 9 hours. It is then cooled to 155° C. and blown with steam for 7.5 hours. The hydrolyzed product is found to have a phosphorus content of 2.3%, a sulfur content of 2.7%, and an acid number of 48. A mixture of 700 parts (0.6 equivalent) of the above acidic, phosphosulfurized polyisobutene, 237 parts (1.23 equivalents) of heptylphenol, 93 parts of water, and 1255 parts of mineral oil is prepared at 70° C. To this mixture there is added 711 parts (9.3 equivalents) of barium oxide and the resulting mixture is carbonated at 135° C. until substantially neutral. To this carbonated product there is added 245 parts (12 equivalents) of boric acid in 1.5 hours at 135°–140° C. The resulting mixture is dried by heating at 150° C. for 2 hours, mixed with a filter aid, and filtered. The filtrate is found to have a barium sulfate ash content of 36.6%, a boron content of 1.2%, a phosphorus content of 0.5%, and a sulfur content of 0.6%. The product is soluble in mineral oils.

*Example 3*

A mixture of 700 parts (0.6 equivalent) of the hydrolyzed, acidic, phosphosulfurized polyisobutene of Example 2, 237 parts (1.23 equivalents) of heptylphenol, 93 parts of water, 1255 parts of mineral oil, and 245 parts (12 equivalents) of boric acid is prepared at 70° C. To this mixture there is added 711 parts (9.2 equivalents) of barium oxide in 1.5 hours at 135°–140° C. The resulting mixture is carbonated until substantially neutral, mixed with a filter aid and filtered. The filtrate has a barium sulfate ash content of 38%, a boron content of 1.1%, a phosphorus content of 0.5%, and a sulfur content of 0.5%. A 10% (by weight) solution of this product in a mineral oil shows the formation of haze at the end of 1 week of storage at room temperature.

It will be noted that Examples 2 and 3 differ only in the mode of adding boric acid to the reaction mixture. Example 2 illustrates the process of this invention which involves first preparing a carbonated, basic metal complex and then reacting boric acid with the complex. The product is soluble in mineral oils. In Example 3, boric acid is added before carbonation and the product obtained by this process is not permanently and completely soluble in mineral oils. Thus, a critical aspect of the process of this invention is the formation of a carbonated, basic metal complex and the reaction thereof with the boron compound. The reason for this criticality is not fully understood, although it appears that the formation of the oil-soluble product of this invention is associated with the reaction of the boron compound with the carbonated portion of the complex. Thus, when a boron acid is used as the reactant, water and carbon dioxide are liberated from the reaction mixture. The precise mechanism of the formation of the product of this invention is not understood.

The boron-containing, basic metal detergent compositions of this invention are useful as additives in lubricating oils, gasolines, diesel fuels, burner fuel oils, cutting oils, greases, transformer oils, power-transmitting fluids such as water-oil hydraulic fluids and automobile transmission fluids. They are especially useful as additives in mineral lubricating compositions for use in internal combustion engines and power transmitting units. The concentration of such additives in oils may vary within wide ranges, depending upon the type of oils and the nature of the service to which the oils are to be subjected. The optimum concentrations usually range from about 0.001% to about 20% by weight. To illustrate, lubricants for use in gasoline internal combustion engines may contain from about 0.5% to about 10% of the additive, lubricants for use in gears and diesel engines may contain more than 10% of the additive, and hydrocarbon fuel oils and gasolines may contain as little as 0.01% or even less of the additive.

The lubricating oils in which the additives of this invention are useful may be of synthetic, animal, vegetable, or mineral origin. Ordinarily mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally the lubricating oils preferred will be fluid oils ranging in viscosity from about 40 Saybolt Universal Seconds at 100° F. to about 200 Saybolt Universal Seconds at 210° F.

To prepare the final oil compositions, the additives of this invention are simply added to the oil at the appropriate concentration. Alternatively a concentrate of such additives may be prepared by dissolving the additives in a limited amount of the oil and the concentrate may then be diluted with additional amounts of the oil to prepare the final oil composition.

The oil compositions in which the additives of this invention are present may contain other additives such as ashless deterents, supplemental metal-containing detergents, corrosion inhibitors, rust inhibitors, oxidation inhibitors, load-carrying additives, anti-foam additives, pour point depressants, viscosity index improving agents, additives to improve the frictional characteristics, etc. The concentrations of these additives in a lubricating composition may range from about 0.001% to 20% by weight.

The ashless detergents include the neutralization products of an alkenyl-substituted succinic anhydride having 50 or more carbon atoms in the alkenyl-substituent with an amine, preferably an alkylene amine such as ethylene diamine, diethylene triamine, tetraethylene pentamine, pentaethylene hexamine, hexamethylene diamine, di-triethylene diamine, piperazine, or aminoethyl morpholine; the copolymer of a long chain alkyl (e.g., dodecyl) acrylate or methacrylate with from 2% to 10% (by weight) of a polar-substituted acrylate or methacrylate, e.g., beta-diethylaminoethyl acrylate).

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohl, Cellosolve, carbitol, ethylene glycol, stearyl alcohol, and cyclohexyl alcohol; amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200° C.

The preparation of a basic sulfonate detergent is illustrated as follows: A mixture of 490 parts (by weight) of a mineral oil, 110 parts of water, 61 parts of heptyl phenol, 340 parts of barium mahogany sulfonate, and 227 parts of barium oxide is heated at 100° C. for 0.5 hour and then to 150° C. Carbon dioxide is then bubbled into the mixture until the mixture is substantially neutral. The mixture is filtered and the filtrate found to have a sulfate ash content of 25%.

Oxidation inhibitors include, for example, hindered phenols, such as 2,6-ditert-butyl-4-methylphenol, 2,2′,6,6′-tetra-tert-butyl-4,4′-methylenebisphenol, and 2-tert-pentyl-isohexylphenol; metal phenates such as barium octylphenate, calcium didodecylphenate, strontium salt of the product obtained by the condensation of a 2:1 molar mixture of heptylphenol and formaldehyde, barium salt of bis(hydroxyphenyl)sulfide, and calcium salt of the product obtained by the condensation of a 2:1 molar mixture of phenol and acetone; amines such as phenylene diamine, N,N′-dibutyl phenylene diamine, naphthyl amine, N-beta-phenyl naphthylamine, o-aminobenzoic acid, p-aminobenzoic acid, methyl ester of o-aminobenzoic acid, and diphenylamine; carbamates and xanthates such as methyl N-octylcarbamate, dodecyl N-phenyldithiocarbamate, and cyclohexyl N,N′-dibutylcarbamate.

Load-carrying additives include, e.g., chlorinated paraffin oils containing from 20% to 70% of chlorine, chlorinated eicosane wax containing from 50% to 60% of chlorine, hexachlorodiphenyl ether, polychloro-diphenyl, etc. Additives to improve the frictional characteristics are illustrated by methyl oleate, oleic acid, stearic acid, sulfurized sperm oil, sperm oil, corn oil, mono-stearyl ester of glycerol, and quionidine dioleate. Pour point depressing agents are, e.g., wax-alkylated naphthylenes, copolymers of butyl methacrylate with decyl methacrylate, etc.

A particularly useful class of additives in lubricating compositions consists of the Group II metal phosphorodithioates and their epoxide adducts. The Group II metal phosphorodithioates are the salts of acids having the formula

in which $R_1$ and $R_2$ are substantially hydrocarbon radicals. The metals for forming such salts are exemplified by barium, calcium, strontium, zinc, and cadmium. The barium and zinc phosphorodithioates are especially preferred. The substantially hydrocarbon radicals in the phosphorodithioic are preferably low or medium molecular weight alkyl radicals and alkylphenyl radicals, i.e., those having from about 1 to about 30 carbon atoms in the alkyl group. Illustrative alkyl radicals include methyl, ethyl, isopropyl, isobutyl, n-butyl, sec-butyl, the various amyl alcohls, n-hexyl, methylisobutyl carbinyl, heptyl, 2-ethylhexyl, diisobutyl, isooctyl, nonyl, behenyl, decyl, etc. Illustrative lower alkylphenyl radicals include butylphenyl, amylphenyl, di-amylphenyl, octylphenyl, etc. Cycloalkyl radicals likewise are useful and these include chiefly cyclohexyl and the lower alkyl-cyclohexyl radicals. Other substantially hydrocarbon radicals likewise are useful such as tetradecyl, octadecyl, eicosyl, butylnaphthyl, hexylnaphthyl, octylnaphthyl, cyclohexylphenyl, naphthenyl, etc. Many substituted hydrocarbon radicals may also be used, e.g., chloropentyl, dichlorophenyl, and dichlorodecyl.

The availability of the phosphorodithioic acids from which the Group II metal salts of this invention are prepared is well known. They are prepared by the reaction of phosphorus pentasulfide with an alcohol or phenol. The reaction involves four moles of the alcohol or phenol per mole of phosphorus pentasulfide, and may be carried out within the temperature range from about 50° C. to about 200° C. Thus the preparation of O,O-di-n-hexyl phosphorodithioic acid involves the reaction of phosphorus pentasulfide with four moles of n-hexyl alcohol at about 100° C. for about 2 hours. Hydrogen sulfide is liberated and the residue is the defined acid. The preparation of the zinc or barium salt of this acid may be effected by reaction with zinc oxide or barium oxide. Simply mixing and heating these two reactants is sufficient to cause the reaction to take place and the resulting product is sufficiently pure for the purposes of this invention.

Especially useful GROUP II metal phosphorodithioates can be prepared from phosphorodithioic acids which in turn are prepared by the reaction of phosphorous pentasulfide with mixtures of alcohols. The use of such mixtures enables the utilization of cheaper alcohols which in themselves do not yield oil-soluble phosphorodithioic acids. Thus a mixture of isopropyl and hexyl alcohols can be used to produce a very effective, oil-soluble metal phosphorodithioate. For the same reason mixtures of simple phosphorodithioic (i.e., acids prepared from one alcohol) acids can be reacted with zinc oxide or barium oxide to produce less expensive, oil-soluble salts.

Another class of the phosphorothioate additives contemplated for use in the lubricating compositions of this invention comprises the adducts of the metal phosphorodithioates described above with an epoxide. The metal phosphorodithioates useful in preparing such adducts are for the most part the zinc phosphorodithioates. The epoxides may be alkylene oxides or arylalkylene oxides.. The arylalkylene oxides are exemplified by styrene oxide, p-ethylstyrene oxide, alpha-methylstyrene oxide, 3-beta-naphthyl-1,3-butylene oxide, m-dodecylstyrene oxide, and p-chlorostyrene oxide. The alkylene oxides include principally the lower alkylene oxides in which the alkylene radical contains 6 or less carbon atoms. Examples of such lower alkylene oxides are ethylene oxide, propylene oxide, 1,2-butene oxide, trimethylene oxide, tetramethylene oxide, butadiene monoepoxide, 1,2-hexene oxide, and propylene epichlorohydrin. Other epoxides useful herein include, for example, butyl 9,10-epoxy-stearate, epoxidized soya bean oil, epoxidized tung oil, and epoxidized copolymer of styrene with butadiene.

The adduct may be obtained by simply mixing the phosphorodithioate and the epoxide. The reaction is usually exothermic and may be carried out within wide temperature limits from about 0° C. to about 200° C. Because the reaction is exothermic it is best carried out by adding one reactant, usually the epoxide, in small increments to the other reactant in order to obtain convenient control of the temperature of the reaction. The reaction may be carried out in a solvent such as benzene, mineral oil, naphtha, or n-hexane.

The chemical structure of the adduct is not known. More than one mole, sometimes as many as four moles, of the epoxide can be made to combine with the phosphorodithioate to form products useful herein. However, adducts obtained by the reaction of one mole of the phosphorodithioate with from about 0.25 mole to about 1 mole of a lower alkylene oxide, particularly ethylene oxide and propylene oxide, have been found to be especially useful and therefore are preferred.

The advantages of the boron-containing, basic metal detergent compositions of this invention are shown by the results of the Metal Corrosion Test. In this test, a lubricating composition containing the additive and having immersed therein five metal pieces, i.e., lead (16.4 grams), stainless steel (2.7 grams), steel (6 grams), copper (9.7 grams), and silver (6.7 grams), is blown at 320° F. for 6 hours with oxygen at a rate of 5 bubbles per second. At the end of the test, the weight loss of the metal pieces is measured. The smaller the weight loss, the less corrosive the lubricating composition. By this test, a SAE 30 mineral oil containing 2% (by weight) of the boron-containing, basic metal detergent composition, prepared by the procedure of Example 1 gives the following results (milligrams of weight loss): lead (none), stainless steel (none), steel (none), copper (0.5), and silver (0.1). By comparison, a similar lubricating composition containing 2% of the carbonated, basic metal complex from which the boron-containing, basic metal detergent composition of Example 1 is derived shows a weight loss of the lead piece of 108 milligrams. Thus, the treatment of the carbonated, basic metal complex with a boron compound by the process of this invention significantly reduces the corrosiveness of the additive.

What is claimed is:

1. A process for preparing boron-containing, basic metal detergent compositions comprising carbonating, at a temperature of at least about 100° C., a mixture of an acidic, phosphosulfurized olefin polymer, a phenol, and at least about 10 equivalents of an alkaline earth metal base per equivalent of said acidic, phosphosulfurized olefin polymer to produce a carbonated, basic metal complex, and treating said carbonated, basic metal complex with from about 0.1 to about 3 equivalents, per equivalent of said alkaline earth metal base, of a boron compound selected from the class consisting of boron oxide, boron acids, and boron acid esters at a temperature of at least about 100° C.

2. The process of claim 1 characterized further in that the acidic, phosphosulfurized olefin polymer is derived by the treatment of an olefin polymer with a phosphorus sulfide.

3. The process of claim 1 characterized further in that the acidic, phosphosulfurized olefin polymer is obtained by hydrolyzing the reaction product of phosphorus pentasulfide with a polymer of isobutene.

4. The process of claim 1 characterized further in that the alkaline earth metal base is barium hydroxide.

5. The process of claim 1 characterized further in that the boron compound is boric acid.

6. A process for preparing boron-containing, basic metal detergent compositions comprising carbonating, at a temperature of at least about 100° C., a mixture of an acidic, phosphosulfurized polyisobutene, an alkylphenol, and at least about 10 equivalents of barium hydroxide per equivalent of said acidic, phosphosulfurized polyisobutene to produce a carbonated basic metal complex, and treating said carbonated, basic metal complex with from about 0.1 to about 3 equivalents of boric acid per equivalent of barium hydroxide, at a temperature of at least about 100° C.

7. A process for preparing boron-containing, basic metal detergent compositions comprising carbonating at a temperature above about 120° C., a mixture comprising an acidic, phosphosulfurized polyisobutene obtained by hydrolyzing the reaction product of a polyisobutene having a molecular weight of about 1000 with phosphorus pentasulfide, heptylphenol, and from about 10 to 20 equivalents of barium hydroxide per equivalent of said acidic, phosphosulfurized polyisobutene to produce a carbonated, basic metal complex and treating said carbonated basic metal complex with from about 10 to 20 equivalents of boric acid at a temperature above about 120° C.

8. The product of the process of claim 1.

9. The product of the process of claim 7.

10. A lubricating composition comprising a major proportion of a lubricating oil and a minor proportion, at least about 0.001% by weight, of the product of the process of claim 1.

11. A lubricating composition comprising a major proportion of a lubricating oil and a minor proportion, at least about 0.001% by weight, of the product of the process of claim 7.

References Cited by the Examiner

UNITED STATES PATENTS

| | | | |
|---|---|---|---|
| 2,921,901 | 1/1960 | Karll et al. | 252—32.7 |
| 3,002,924 | 10/1961 | Sabol et al. | 252—32.7 |
| 3,002,925 | 10/1961 | Sabol et al. | 252—32.7 |
| 3,003,959 | 10/1961 | Wilson et al. | 252—32.7 |

DANIEL E. WYMAN, *Primary Examiner.*

J. R. SEILER, L. G. XIARHOS, *Assistant Examiners.*